(12) United States Patent
Lee

(10) Patent No.: US 11,201,019 B2
(45) Date of Patent: Dec. 14, 2021

(54) WIRELESS MOUSE AND SWITCH MODULE APPLIED THEREIN

(71) Applicant: Cheng Uei Precision Industry Co., Ltd., New Taipei (TW)

(72) Inventor: Tsung Shih Lee, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 21 days.

(21) Appl. No.: 16/991,702

(22) Filed: Aug. 12, 2020

(65) Prior Publication Data

US 2021/0142959 A1  May 13, 2021

(30) Foreign Application Priority Data

Nov. 8, 2019 (CN) .......................... 201921925961.8

(51) Int. Cl.
*H01H 3/12* (2006.01)
*G06F 3/02* (2006.01)
*G06F 3/038* (2013.01)
*G06F 3/0354* (2013.01)

(52) U.S. Cl.
CPC ............ *H01H 3/12* (2013.01); *G06F 3/0202* (2013.01); *G06F 3/038* (2013.01); *G06F 3/03543* (2013.01); *G06F 2203/0384* (2013.01)

(58) Field of Classification Search
CPC ..... H01H 3/12; G06F 3/0202; G06F 3/03543; G06F 3/038; G06F 2203/0384
See application file for complete search history.

(56) References Cited

U.S. PATENT DOCUMENTS

| 5,828,364 A | * | 10/1998 | Siddiqui | ............... | G06F 3/0312 |
| | | | | | 345/163 |
| 2005/0243058 A1 | * | 11/2005 | Morris | .................. | H04W 52/04 |
| | | | | | 345/158 |
| 2014/0076701 A1 | * | 3/2014 | Lan | ...................... | G06F 3/03543 |
| | | | | | 200/341 |
| 2021/0103347 A1 | * | 4/2021 | Lee | ......................... | G06F 3/038 |
| 2021/0132707 A1 | * | 5/2021 | Chen | .................. | G06F 3/03543 |

* cited by examiner

*Primary Examiner* — Ariel A Balaoing
(74) *Attorney, Agent, or Firm* — Lin & Associates Intellectual Property, Inc.

(57) ABSTRACT

A switch module includes a pressing button and a circuit board. The pressing button includes a fastening element. The fastening element extends outward to form a cantilever arm. The cantilever arm protrudes downward to form an operation rod. The operation rod is exposed out of a lower shell which has a first position and a second position. The operation rod slides from the first position to the second position. The other end of the bottom surface of the cantilever arm extends outward to form an extending arm. At least one portion of one end of a top surface of the cantilever arm protrudes upward to form at least one extending foot. The circuit board is disposed above the pressing button. The circuit board is equipped with a first switch and a second switch. The at least one extending foot is corresponding to the first switch.

16 Claims, 10 Drawing Sheets

WIRELESS MOUSE AND SWITCH MODULE APPLIED THEREIN

CROSS-REFERENCE TO RELATED APPLICATION

The present application is based on, and claims priority from, China Patent Application No. 201921925961.8, filed Nov. 8, 2019, the disclosure of which is hereby incorporated by reference herein in its entirety.

BACKGROUND OF THE INVENTION

1. Field of the Invention

The present invention generally relates to a switch and a mouse, and more particularly to a wireless mouse, and a switch module applied in the wireless mouse which has a lower cost and occupies a smaller space.

2. The Related Art

As is known to all, a wireless mouse has a wireless transmission capacity and is capable of being paired with a computer host to be used by a wireless technology. When a user operates the wireless mouse, the wireless mouse is used without a limitation of a cable, so the wireless mouse is used quite conveniently.

Generally, when a conventional wireless mouse is paired with the computer host, a USB (Universal Serial Bus) adaptor need be inserted into an insertion hole of the computer host. Operation orders of the conventional wireless mouse are capable of being transmitted to the computer host by virtue of the USB adaptor. However, the conventional wireless mouse need provide the USB adaptor to the user, and the conventional wireless mouse is rather smaller in size, so when the conventional wireless mouse is used, the conventional wireless mouse will have a loss problem.

Another conventional wireless mouse is a bluetooth mouse, the bluetooth mouse is capable of being paired with the computer host to be used through a bluetooth technology, and the USB adaptor is needless of being provided in addition. However, the bluetooth mouse need provide a pairing key additionally, when the user uses the bluetooth mouse, a power switch of the bluetooth mouse must be turned on, and then the pairing key is pressed to proceed with a bluetooth pairing.

Furthermore, the bluetooth mouses on the market, the power switch and a bluetooth pairing key of the bluetooth mouse are mostly two independent and separated structures, so the bluetooth mouse has a higher manufacturing cost and a larger space is considered to mount the power switch and the bluetooth paring key in each bluetooth mouse. As a result, the bluetooth mouse has a higher cost and occupies a larger space.

In view of the above-mentioned problems, it is essential to provide an innovative wireless mouse, and an innovative switch module applied in the innovative wireless mouse which has a lower cost and occupies a smaller space.

SUMMARY OF THE INVENTION

An object of the present invention is to provide a switch module applied in a wireless mouse. The wireless mouse includes a lower shell. The switch module includes a pressing button and a circuit board. The pressing button includes a fastening element. One end of the fastening element extends outward to form a cantilever arm. One end of a bottom surface of the cantilever arm protrudes downward to form an operation rod. The operation rod is slidably exposed out of the lower shell. The lower shell has a first position and a second position opposite to each other. The operation rod slides from the first position to the second position. The other end of the bottom surface of the cantilever arm extends outward to form an extending arm disposed to one end of the operation rod. At least one portion of one end of a top surface of the cantilever arm protrudes upward to form at least one extending foot. Bottom surfaces of the cantilever arm and the extending arm are attached to a top surface of a lower portion of the lower shell for guiding the operation rod to move from the first position to the second position. The circuit board is disposed above and faces to a top surface of the pressing button. The circuit board is equipped with a first switch and a second switch. The first switch is mounted to a top surface of one side of the circuit board. The second switch is mounted to a bottom surface of the circuit board. The at least one extending foot is corresponding to the first switch. When the operation rod is located at the first position, the at least one extending foot is without driving the first switch, at the moment, a power function is turned off, when the operation rod is located at the second position, the at least one extending foot drives the first switch to move, at the moment, the power function is turned on, the operation rod is pressed to make the extending arm pressed on and touch the second switch to execute a bluetooth pairing function.

Another object of the present invention is to provide a switch module applied in a wireless mouse. The wireless mouse includes a lower shell. The switch module includes a pressing button and a circuit board. The pressing button includes a fastening element. One end of the fastening element extends outward to form a cantilever arm. One end of a bottom surface of the cantilever arm protrudes downward to form an operation rod. A rear of the lower shell defines a sliding groove penetrating through the lower shell along an up-down direction. The operation rod is slidably exposed to the sliding groove. A rear end and a front end of the sliding groove are defined as a first position and a second position. The operation rod slides from the first position to the second position. The other end of the bottom surface of the cantilever arm extends outward to form an extending arm disposed to one end of the operation rod. Two portions of one end of a top surface of the cantilever arm protrudes upward to form two extending feet. The circuit board is disposed above and faces to a top surface of the pressing button. The circuit board is equipped with a first switch and a second switch. The first switch is mounted to a top surface of one side of the circuit board. The second switch is mounted to a bottom surface of the circuit board. One side of the first switch has a sliding bar. The sliding bar is clamped between the two extending feet. When the operation rod is located at the first position, the two extending feet are without driving the first switch, at the moment, a power function is turned off, when the operation rod is located at the second position, the two extending feet drive the sliding bar of the first switch to move, at the moment, the power function is turned on, the operation rod is pressed to make the extending arm pressed on and touch the second switch to execute a bluetooth pairing function.

Another object of the present invention is to provide a wireless mouse. The wireless mouse includes a lower shell, an upper shell and a switch module. The upper shell is covered to the lower shell to form an accommodating space between the upper shell and the lower shell. The switch module is accommodated in the accommodating space. The switch module includes a pressing button and a circuit board. The pressing button includes a fastening element. One end of the fastening element extends outward to form a cantilever arm. One end of a bottom surface of the cantilever arm protrudes downward to form an operation rod. A rear of the lower shell defines a sliding groove penetrating through the lower shell along an up-down direction. The operation rod is slidably exposed to the sliding groove. A rear end and a front end of the sliding groove are defined as a first position and a second position. The operation rod slides from the first position to the second position. The other end of the bottom surface of the cantilever arm extends outward to form an extending arm disposed to one end of the operation rod. Two portions of one end of a top surface of the cantilever arm protrudes upward to form two extending feet. The circuit board is disposed above and faces to a top surface of the pressing button. The circuit board is equipped with a first switch and a second switch. The first switch is mounted to a top surface of one side of the circuit board. The second switch is mounted to a bottom surface of the circuit board. One side of the first switch has a sliding bar. The sliding bar is clamped between the two extending feet. When the operation rod is located at the first position, the two extending feet are without driving the first switch, at the moment, a power function is turned off, when the operation rod is located at the second position, the two extending feet drive the sliding bar of the first switch to move, at the moment, the power function is turned on, the operation rod is pressed to make the extending arm pressed on and touch the second switch to execute a bluetooth pairing function.

As described above, when the operation rod slides frontward and rearward in the sliding groove, the at least one extending foot moves frontward and rearward and drives the sliding bar of the first switch to move frontward and rearward to realize the power function. When the operation rod of the pressing button is located at the first position, the at least one extending foot is without driving the first switch, at the moment, the power function is turned off. When the operation rod of the pressing button is located at the second position, the at least one extending foot drives the sliding bar of the first switch to move, at the moment, the power function is turned on, when the power function is turned on, the operation rod of the pressing button is pressed to make the extending arm pressed on and touch the second switch of the circuit board to execute the bluetooth pairing function, the first switch, the second switch, the cantilever arm and the extending arm are combined to a function module, so the wireless mouse applying the switch module has a lower cost and occupies a smaller space.

BRIEF DESCRIPTION OF THE DRAWINGS

The present invention will be apparent to those skilled in the art by reading the following description, with reference to the attached drawings, in which:

FIG. 8 is a schematic diagram showing that a power function of the wireless mouse in accordance with the present invention is turned on;

FIG. 9 is a schematic diagram showing that the power function of the switch module in accordance with the present invention is turned on.

DETAILED DESCRIPTION OF THE PREFERRED EMBODIMENT

Figure 1:
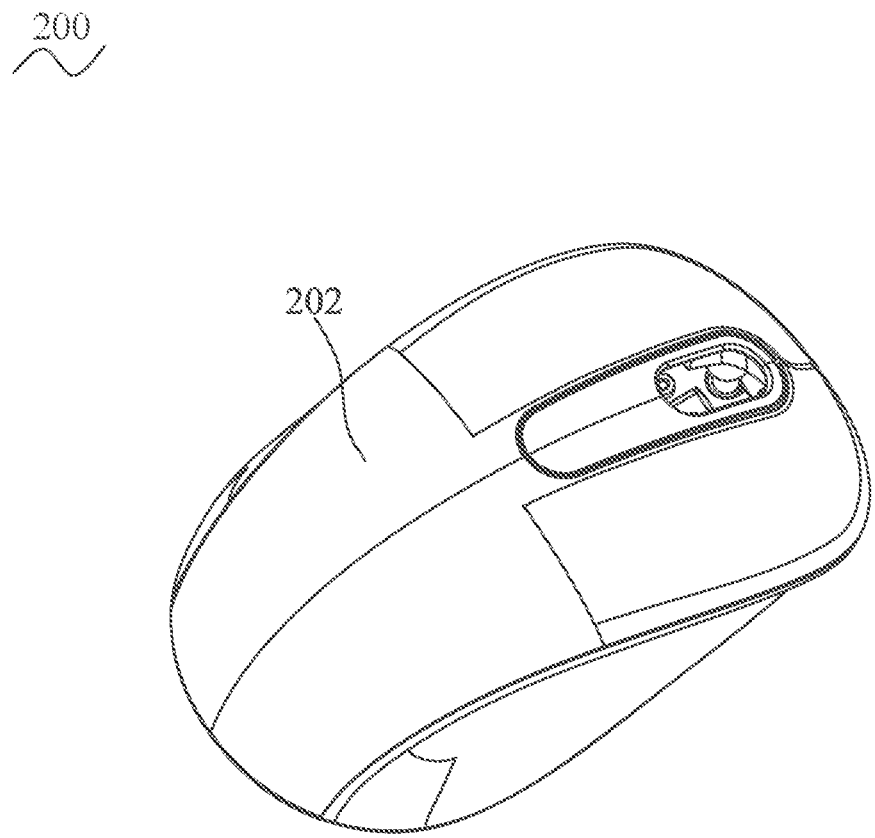
FIG. 1 is a perspective view of a wireless mouse in accordance with a preferred embodiment of the present invention.
Figure 2:
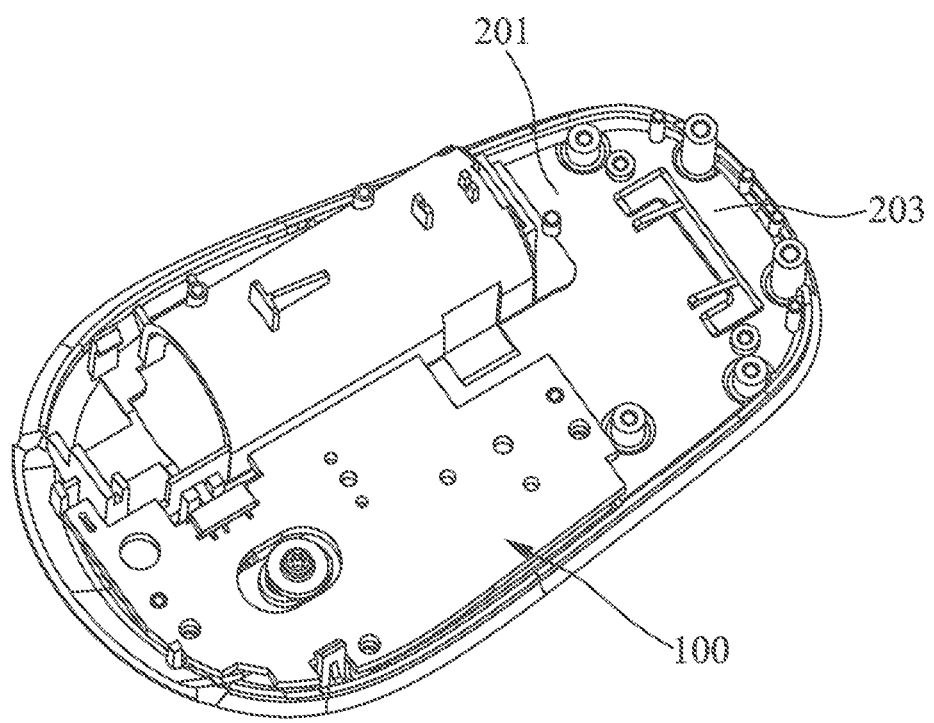
FIG. 2 is a location diagram of a switch module applied in the wireless mouse of FIG. 1.
Figure 3:
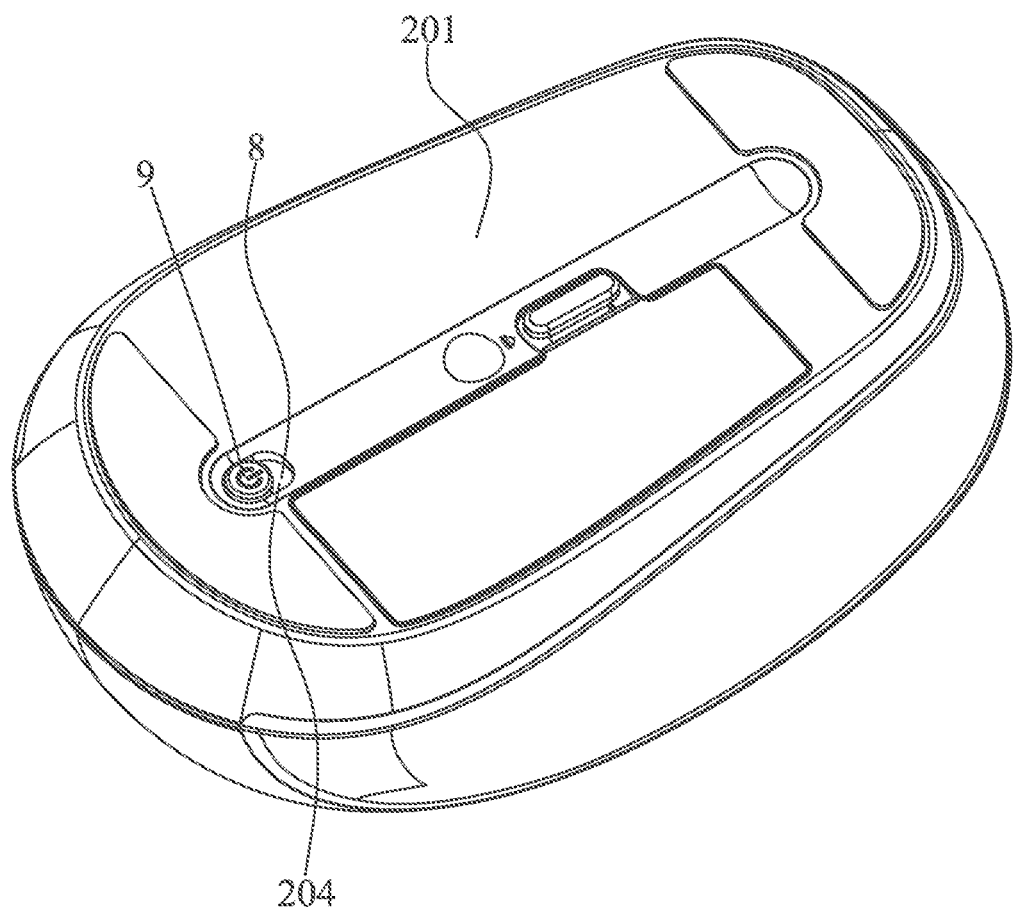
FIG. 3 is another perspective view of the wireless mouse of FIG. 1.
Figure 4:
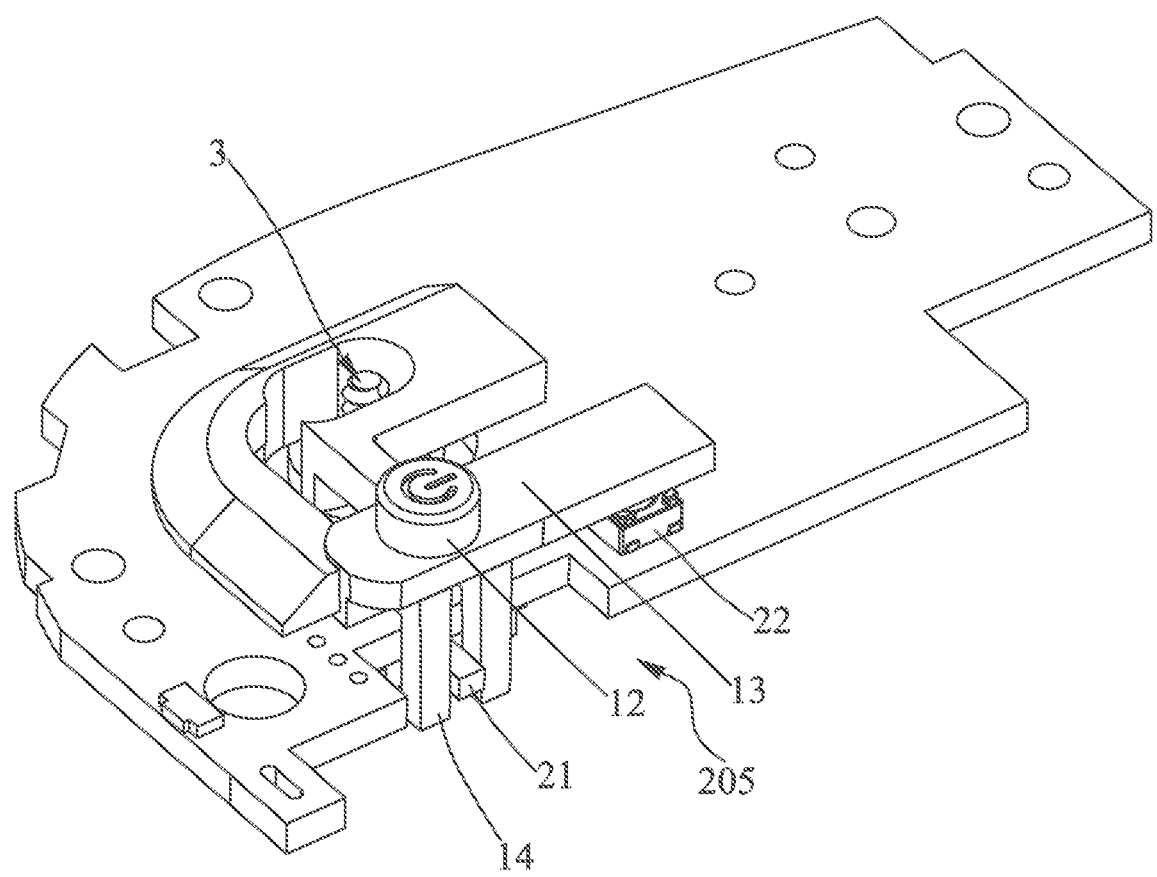
FIG. 4 is a perspective view of the switch module of the wireless mouse of FIG. 1.
Figure 5:
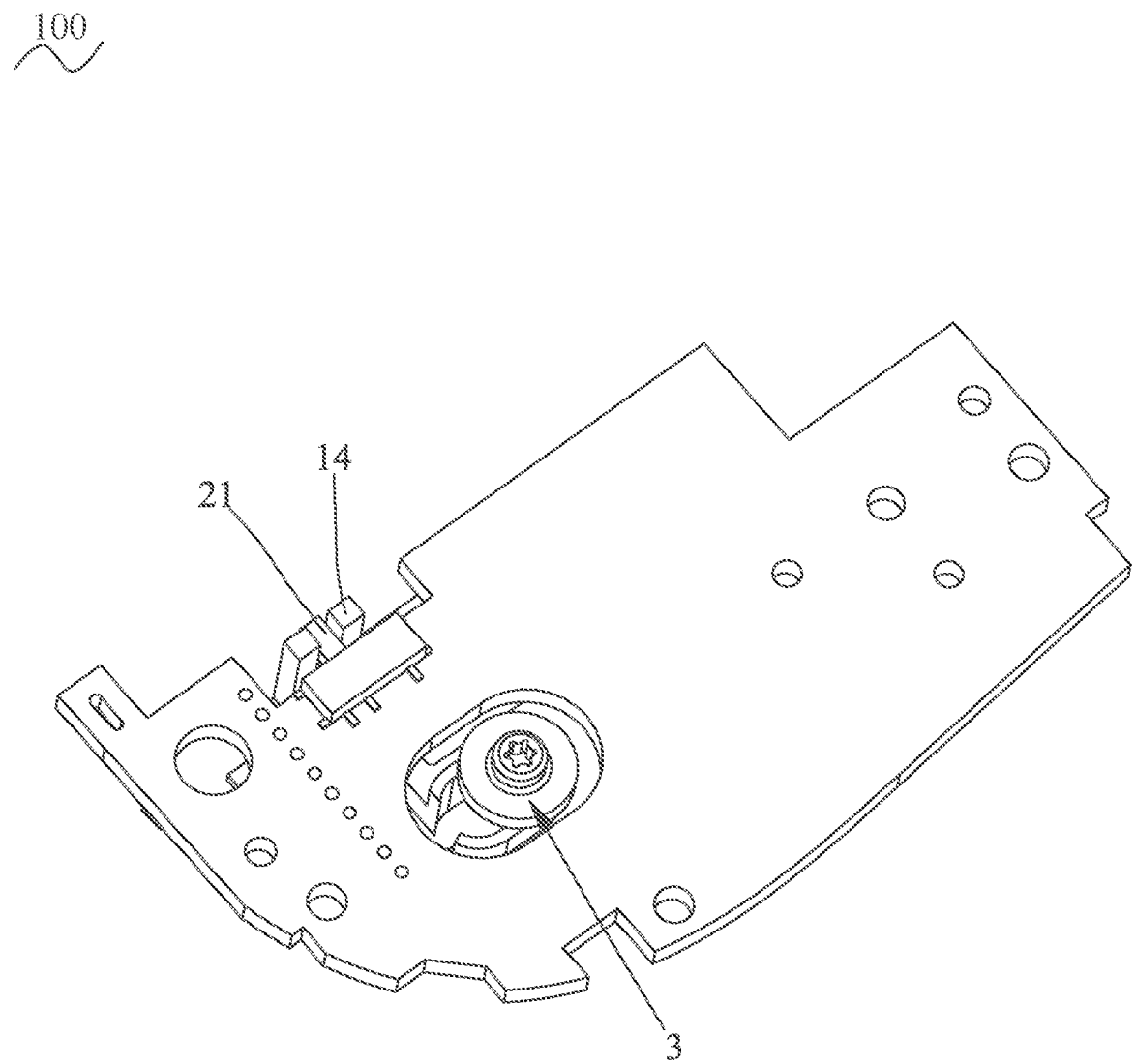
FIG. 5 is another perspective view of the switch module of the wireless mouse of FIG. 1.
Figure 6:
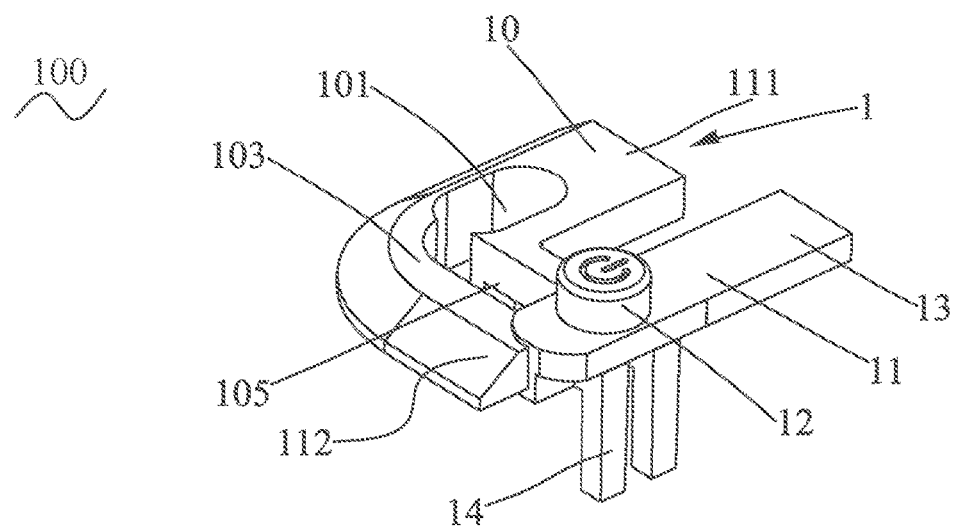
FIG. 6 is an exploded perspective view of the switch module of the wireless mouse of FIG. 1.
Figure 6:
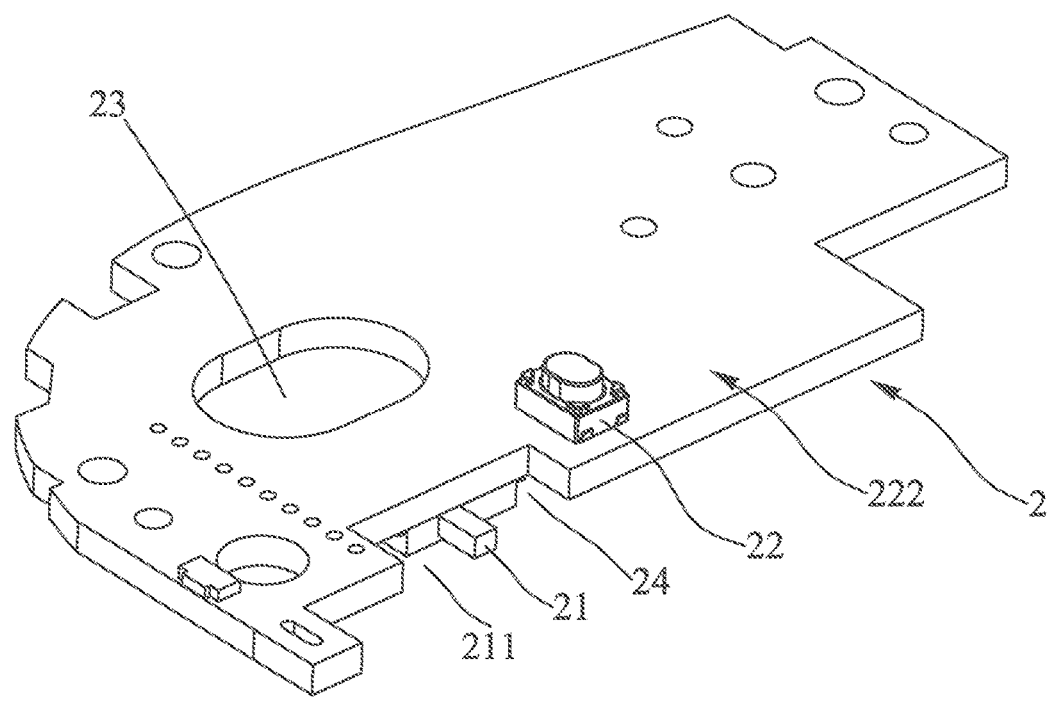
Figure 6:
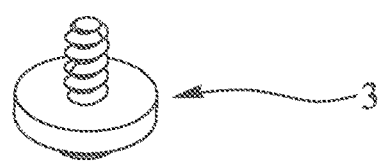
Figure 7:
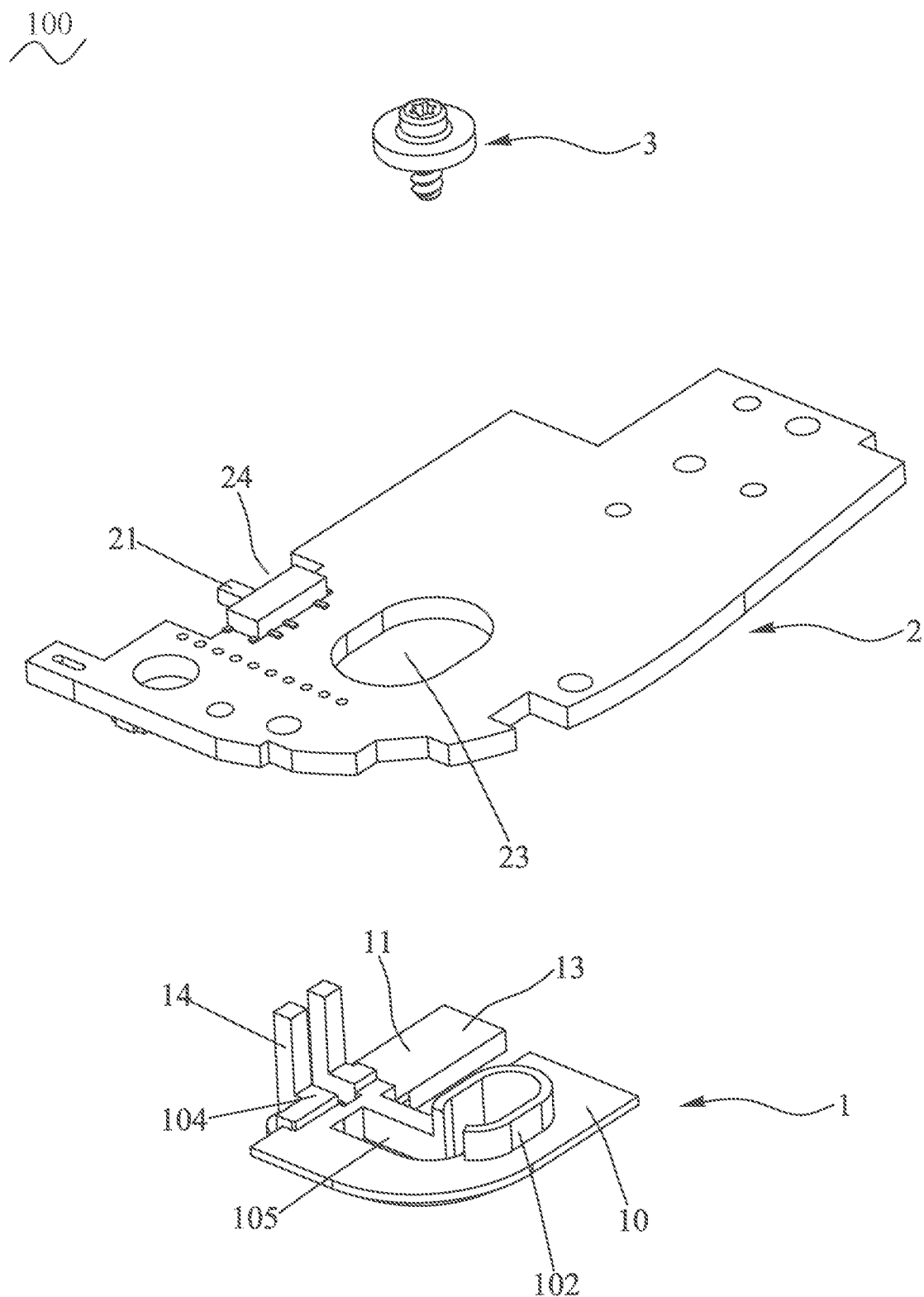
FIG. 7 is another exploded perspective view of the switch module of the wireless mouse of FIG. 1.
Figure 8:
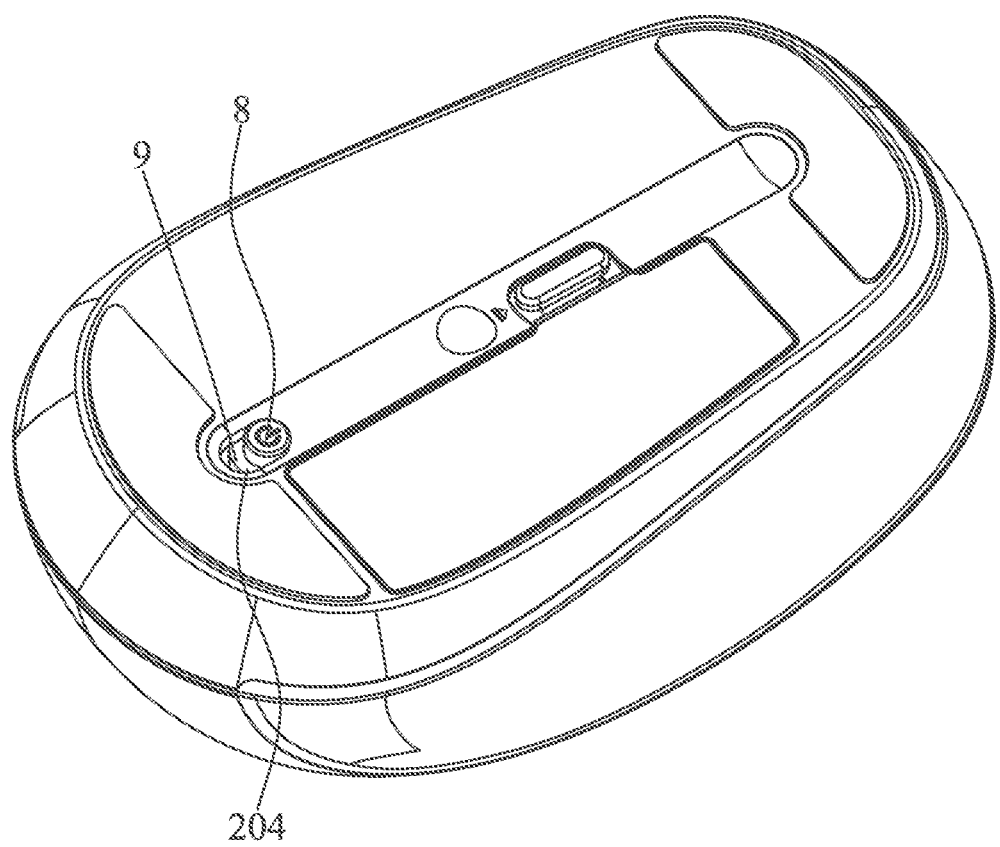
Figure 9:
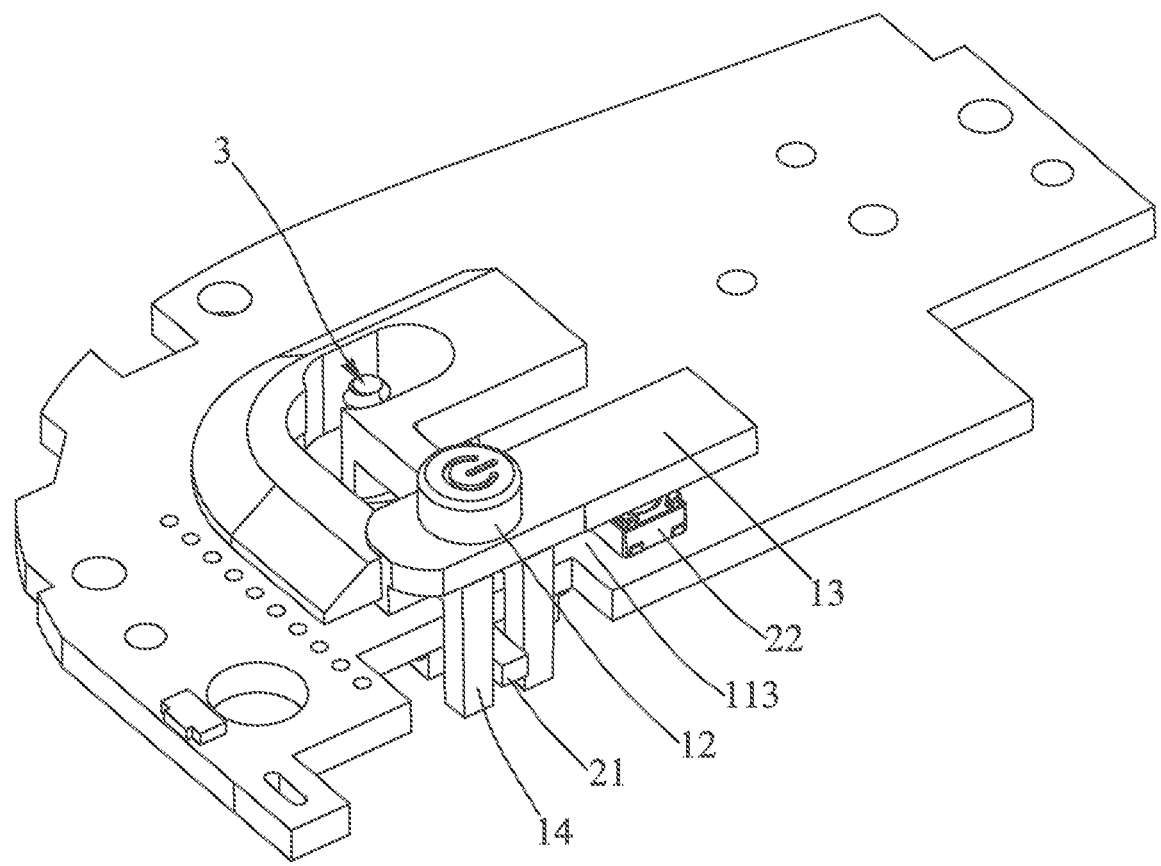
Figure 10:
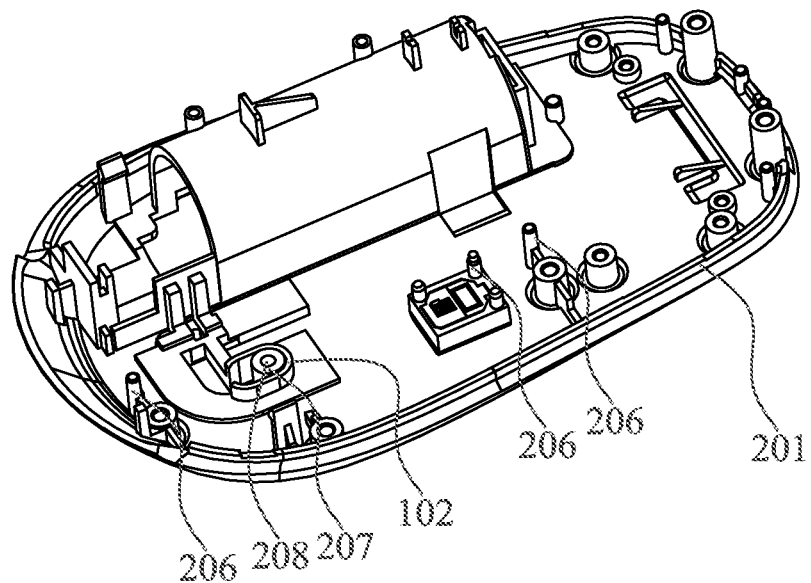
FIG. 10 is a partially perspective view of the wireless mouse in accordance with the present invention.

With reference to FIG. 1 to FIG. 3, a switch module 100 and a wireless mouse 200 in accordance with a preferred embodiment of the present invention are shown. The switch module 100 is applied in the wireless mouse 200. The wireless mouse 200 includes a lower shell 201, the switch module 100 and an upper shell 202. The switch module 100 is mounted to the lower shell 201 of the wireless mouse 200.

The switch module 100 is mounted between the lower shell 201 and the upper shell 202. The upper shell 202 is covered to the lower shell 201 to form an accommodating space 203 between the upper shell 202 and the lower shell 201. The switch module 100 is accommodated in the accommodating space 203. A rear of the lower shell 201 defines a sliding groove 204 penetrating through the lower shell 201 along an up-down direction. In a concrete implementation, the switch module 100 is also capable of being assembled to other types of devices (not shown). Several portions of a top surface of a lower portion of the lower shell 201 of the wireless mouse 200 protrude upward to form a plurality of propping portions 206. The top surface of the lower portion of the lower shell 201 protrudes upward to form a hollow location pillar 207. The location pillar 207 is disposed among the plurality of the propping portions 206. A middle of the hollow location pillar 207 defines an insertion hole 208 penetrating through a top of the middle of the hollow location pillar 207.

With reference to FIG. 4 to FIG. 7, the switch module 100 includes a pressing button 1, a circuit board 2 and a screw 3. The pressing button 1 is disposed to a bottom surface of the circuit board 2. The screw 3 passes through corresponding mechanisms of the circuit board 2 and the pressing button 1 for fastening the pressing button 1 to the lower shell 201 of the wireless mouse 200 to prevent the pressing button 1 being disengaged from the circuit board 2 and the lower shell 201 of the wireless mouse 200.

The pressing button 1 is fastened to the lower shell 201, and is fastened in the accommodating space 203 of the wireless mouse 200. The pressing button 1 includes a fastening element 10 and a cantilever arm 11. The fastening element 10 is an L shape seen from a bottom view. The fastening element 10 is fastened to the lower shell 201 of the wireless mouse 200 to make the pressing button 1 without being deviated from and fallen off from the lower shell 201. One end of the fastening element 10 extends outward and then extends towards a same extending direction of the other end of the fastening element 10 to form a lengthwise cantilever arm 11. The cantilever arm 11 faces to and is spaced from the other end of the fastening element 10. Specifically, the fastening element 10 has a longitudinal section 111, and a transverse section 112 bent sideward from a rear end of the longitudinal section 111. A free end of the transverse section 112 extends outward and then extends frontward to form the cantilever arm 11.

The cantilever arm 11 is spaced from the circuit board 2 to form a gap 113 between the cantilever arm 11 and the circuit board 2. The cantilever arm 11 is capable of being pressed into the gap 113, and being rebounded to an original position after the cantilever arm 11 is pressed into the gap 113. The cantilever arm 11 has an operation rod 12 and a plurality of extending feet 14. The operation rod 12 is slidably exposed out of the lower shell 201. The operation rod 12 is slidably exposed to the sliding groove 204 of the lower shell 201. One end of a bottom surface of the cantilever arm 11 protrudes downward to form the operation rod 12. The other end of the bottom surface of the cantilever arm 11 extends outward and then extends to a top surface of the cantilever arm 11 to form an extending arm 13 disposed to one end of the operation rod 12. A peripheral surface of the extending arm 13 is flush with a peripheral surface of the cantilever arm 11. The cantilever arm 11 is in alignment with the extending arm 13. The extending arm 13 is used for being pressed on and touching a corresponding mechanism 222 of the circuit board 2 to execute a bluetooth pairing function.

At least one portion of one end of the top surface of the cantilever arm 11 protrudes upward to form at least one extending foot 14. A corresponding structure 211 of the circuit board 2 is fastened to the at least one extending foot 14. The operation rod 12 is disposed under the at least one extending foot 14. The operation rod 12 is in alignment with the at least one extending foot 14. In the preferred embodiment, two portions of the one end of the top surface of the cantilever arm 11 protrude upward to form two extending feet 14. The corresponding structure 211 of the circuit board 2 is clamped between the two extending feet 14. The operation rod 12 is in alignment with the two extending feet 14. When the operation rod 12 is pushed, the two extending feet 14 drive the corresponding structure of the circuit board 2 to realize a power function.

The fastening element 10 defines a through-hole 101 vertically penetrating through the top surface and a bottom surface of the fastening element 10 along the up-down direction. The fastening element 10 further includes a limiting portion 102, a location surface 103, a plurality of reinforcing blocks 104 and an extending groove 105. The screw 3 is inserted into the insertion hole 208 and passes through the through-hole 101 of the pressing button 1 for fastening the pressing button 1 to the lower shell 201 of the wireless mouse 200 to prevent the pressing button 1 being disengaged from the lower shell 201 of the wireless mouse 200.

The top surface of the fastening element 10 protrudes upward to form the limiting portion 102 which is shown as an unclosed ring shape. The location pillar 207 is located in the through-hole 101. The limiting portion 102 surrounds the through-hole 101 and the location pillar 207. The location pillar 207 supports a bottom surface of an upper portion of the screw 3. The limiting portion 102 is used for limiting a position of the screw 3 to prevent the screw 3 being deviated from the circuit board 2 and the lower shell 201 of the wireless mouse 200. At least two portions of one end of the top surface of the fastening element 10 connecting with the top surface of the cantilever arm 11 protrude upward to form at least two reinforcing blocks 104. When the pressing button 1 is pressed towards the circuit board 2, the at least two reinforcing blocks 104 abut against the circuit board 2 to realize a stopping and blocking function so as to make a pressed distance of the pressing button 1 being pressed towards the circuit board 2 constant.

The fastening element 10 defines the extending groove 105 bent towards the cantilever arm 11 from a rear end of the through-hole 101, and penetrating through the top surface and the bottom surface of the fastening element 10. One end of the extending groove 105 is connected with the through-hole 101, and the other end of the extending groove 105 is connected with the cantilever arm 11. The bottom surface of the fastening element 10 has the location surface 103 disposed to an outer side of the extending groove 105. The location surface 103 is fastened to the top surface of the lower portion of the lower shell 201 of the wireless mouse 200 to prevent the pressing button 1 being deviated from and sunk from the lower shell 201. Bottom surfaces of the cantilever arm 11 and the extending arm 13 are attached to the top surface of the lower portion of the lower shell 201 for guiding the operation rod 12 to move from the first position 8 to the second position 9. In the preferred embodiment, an extending direction of the extending groove 105 is substantially perpendicular to an extending direction of the cantilever arm 11. In the preferred embodiment, the pressing button 1 is an elastic body, and has a pressed function and a resilience function.

The circuit board 2 is disposed above and faces to a top surface of the pressing button 1. The plurality of the propping portions 206 support against the circuit board 2 to make the circuit board 2 spaced from the pressing button 1 and the cantilever arm 11. The circuit board 2 is equipped with a first switch 21, a second switch 22, a location hole 23 and an accommodating recess 24. One side of the circuit board 2 is recessed inward to form the accommodating recess 24. The first switch 21 is mounted to a top surface of the one side of the circuit board 2 and partially projects above the accommodating recess 24. The second switch 22 is mounted to the bottom surface of the circuit board 2 and is located adjacent to one end of the accommodating recess 24. One side of the first switch 21 has a sliding bar 211. The sliding bar 211 is located above the accommodating recess 24. The pressing button 1 is mounted under and spaced from the circuit board 2. The cantilever arm 11 is located under and spaced from the accommodating recess 24 and the second switch 22 of the circuit board 2, and the extending arm 13 is spaced from the second switch 22. The accommodating recess 24 makes the cantilever arm 11 have a space for sliding and being pressed. The at least one extending foot 14 projects into the accommodating recess 24. The at least one extending foot 14 is corresponding to the sliding bar 211 of the first switch 21. The two extending feet 14 project into the accommodating recess 24. The sliding bar 211 is disposed between and clamped between the two extending feet 14 of the pressing button 1. The sliding bar 211 is located above and spaced from the cantilever arm 11 and the extending arm 13. The cantilever arm 11 and the at least one extending foot 14 are pressed upward or rebounded to original positions with respect to the circuit board 2 and the sliding bar 211. The cantilever arm 11 and the two extending feet 14 are pressed upward or rebounded to the original positions with respect to the circuit board 2 and the sliding bar 211.

In the preferred embodiment, the first switch 21 is a power switch. The second switch 22 is a pairing switch. The screw 3 passes through the location hole 23 and the through-hole 101 to fasten the switch module 100. In the concrete implementation, the switch module 100 is capable of being fastened by other ways. When the operation rod 12 slides frontward and rearward in the sliding groove 204, the at least one extending foot 14 moves frontward and rearward and drives the sliding bar 211 of the first switch 21 to move frontward and rearward to realize a power function. When the extending arm 13 is pressed towards the second switch 22 by pressing the operation rod 12, the extending arm 13 touches the second switch 22 to execute the bluetooth pairing function. The at least one extending foot 14 is received in the accommodating space 203, when the operation rod 12 is pressed towards the circuit board 2, the at least one extending foot 14 moves upward in the accommodating space 203. When the operation rod 12 is released, the at least one extending foot 14 returns back in the accommodating space 203. The first switch 21, the second switch 22, the cantilever arm 11 and the extending arm 13 are combined to a function module 205.

The lower shell 201 has a first position 8 and a second position 9 opposite to each other. A rear end and a front end of the sliding groove 204 are defined as the first position 8 and the second position 9. The operation rod 12 slides from the first position 8 to the second position 9 of the sliding groove 204. When the operation rod 12 of the pressing button 1 is located at the first position 8, the at least one extending foot 14 is without driving the first switch 21, at the moment, the power function is turned off. When the operation rod 12 of the pressing button 1 is pushed to be located at the second position 9, the at least one extending foot 14 drives the sliding bar 211 of the first switch 21 to move, at the moment, the power function is turned on, when the power function is turned on, the operation rod 12 of the pressing button 1 is pressed to make the extending arm 13 pressed on and touch the second switch 22 of the circuit board 2 to execute the bluetooth pairing function.

When the operation rod 12 slides frontward and rearward in the sliding groove 204, the two extending feet 14 move frontward and rearward and drive the sliding bar 211 of the first switch 21 to move frontward and rearward to realize the power function. When the extending arm 13 is pressed towards the second switch 22, the extending arm 13 touches the second switch 22 to execute the bluetooth pairing function. When the operation rod 12 of the pressing button 1 is located at the first position 8, the two extending feet 14 are without driving the first switch 21, at the moment, the power function is turned off. When the operation rod 12 of the pressing button 1 is pushed to be located at the second position 9, the two extending feet 14 drives the sliding bar 211 of the first switch 21 to move, at the moment, the power function is turned on, when the power function is turned on, the operation rod 12 of the pressing button 1 is pressed to make the extending arm 13 pressed on and touch the second switch 22 of the circuit board 2 to execute the bluetooth pairing function.

As described above, when the operation rod 12 slides frontward and rearward in the sliding groove 204, the at least one extending foot 14 moves frontward and rearward and drives the sliding bar 211 of the first switch 21 to move frontward and rearward to realize the power function. When the operation rod 12 of the pressing button 1 is located at the first position 8, the at least one extending foot 14 is without driving the first switch 21, at the moment, the power function is turned off. When the operation rod 12 of the pressing button 1 is pushed to be located at the second position 9, the at least one extending foot 14 drives the sliding bar 211 of the first switch 21 to move, at the moment, the power function is turned on, when the power function is turned on, the operation rod 12 of the pressing button 1 is pressed to make the extending arm 13 pressed on and touch the second switch 22 of the circuit board 2 to execute the bluetooth pairing function, the first switch 21, the second switch 22, the cantilever arm 11 and the extending arm 13 are combined to the function module 205, so the wireless mouse 200 applying the switch module 100 has a lower cost and occupies a smaller space.

What is claimed is:

1. A switch module applied in a wireless mouse, the wireless mouse including a lower shell, the switch module comprising:
    a pressing button including a fastening element, one end of the fastening element extending outward to form a cantilever arm, one end of a bottom surface of the cantilever arm protruding downward to form an operation rod, the operation rod being slidably exposed out of the lower shell, the lower shell having a first position and a second position opposite to each other, the operation rod sliding from the first position to the second position, the other end of the bottom surface of the cantilever arm extending outward to form an extending arm disposed to one end of the operation rod, at least one portion of one end of a top surface of the cantilever arm protruding upward to form at least one extending foot, bottom surfaces of the cantilever arm and the extending arm being attached to a top surface of a lower portion of the lower shell for guiding the operation rod to move from the first position to the second position; and
    a circuit board being disposed above and facing to a top surface of the pressing button, the circuit board being equipped with a first switch and a second switch, the first switch being mounted to a top surface of one side of the circuit board, the second switch being mounted to a bottom surface of the circuit board, the at least one extending foot being corresponding to the first switch,
    wherein when the operation rod is located at the first position, the at least one extending foot is without driving the first switch, at the moment, a power function is turned off, when the operation rod is located at the second position, the at least one extending foot drives the first switch to move, at the moment, the power function is turned on, the operation rod is pressed to make the extending arm pressed on and touch the second switch to execute a bluetooth pairing function.

2. The switch module as claimed in claim 1, wherein the other end of the bottom surface of the cantilever arm extends outward and then extends to the top surface of the cantilever arm to form the extending arm, the cantilever arm is in alignment with the extending arm, the operation rod is in alignment with the at least one extending foot.

3. The switch module as claimed in claim 2, wherein the fastening element defines a through-hole vertically penetrating through a top surface and a bottom surface of the fastening element, the top surface of the lower portion of the lower shell protrudes upward to form a hollow location pillar, the location pillar is located in the through-hole, a middle of the hollow location pillar defines an insertion hole penetrating through a top of the middle of the hollow location pillar, the switch module includes a screw, the screw is inserted into the insertion hole and passes through the through-hole.

4. The switch module as claimed in claim 3, wherein the fastening element includes a limiting portion, a location surface, a plurality of reinforcing blocks and an extending groove, the top surface of the fastening element protrudes upward to form the limiting portion which is shown as an unclosed ring shape, the limiting portion surrounds the through-hole and the location pillar, the location pillar supports a bottom surface of an upper portion of the screw.

5. The switch module as claimed in claim 4, wherein the fastening element defines the extending groove bent towards the cantilever arm from a rear end of the through-hole, and penetrating through the top surface and the bottom surface of the fastening element, one end of the extending groove is connected with the through-hole, and the other end of the extending groove is connected with the cantilever arm, the bottom surface of the fastening element has the location surface disposed to an outer side of the extending groove, the location surface is fastened to the top surface of the lower portion of the lower shell.

6. The switch module as claimed in claim 4, wherein at least two portions of one end of the top surface of the fastening element connecting with the top surface of the cantilever arm protrude upward to form at least two reinforcing blocks.

7. The switch module as claimed in claim 1, wherein one side of the circuit board is recessed inward to form an accommodating recess, one side of the first switch has a sliding bar, the sliding bar is located above the accommodating recess, the second switch is mounted to the bottom surface of the circuit board and is located adjacent to one end of the accommodating recess, the cantilever arm is located under and spaced from the accommodating recess.

8. The switch module as claimed in claim 1, wherein the pressing button is an elastic body.

9. The switch module as claimed in claim 1, wherein the fastening element has a longitudinal section, and a transverse section bent sideward from a rear end of the longitudinal section, a free end of the transverse section extends outward and then extends frontward to form the cantilever arm.

10. The switch module as claimed in claim 1, wherein a rear of the lower shell defines a sliding groove penetrating through the lower shell along an up-down direction, the operation rod is exposed to the sliding groove, a rear end and a front end of the sliding groove are defined as the first position and the second position, the operation rod slides from the first position to the second position of the sliding groove.

11. The switch module as claimed in claim 1, wherein the first switch, the second switch, the cantilever arm and the extending arm are combined to a function module.

12. The switch module as claimed in claim 1, wherein two portions of the one end of the top surface of the cantilever arm protrude upward to form two extending feet, one side of the circuit board is recessed inward to form an accommodating recess, the two extending feet project into the accommodating recess, one side of the first switch has a sliding bar, the sliding bar is clamped between the two extending feet.

13. The switch module as claimed in claim 1, wherein one side of the first switch has a sliding bar, the sliding bar is located above and spaced from the cantilever arm and the extending arm, the cantilever arm and the at least one extending foot are pressed upward or rebounded to original positions with respect to the circuit board and the sliding bar.

14. The switch module as claimed in claim 1, wherein the switch module is mounted between the lower shell and an upper shell, the upper shell is covered to the lower shell to form an accommodating space between the upper shell and the lower shell, the at least one extending foot is received in the accommodating space, when the operation rod is pressed towards the circuit board, the at least one extending foot moves upward in the accommodating space, when the operation rod is released, the at least one extending foot returns back in the accommodating space.

15. A switch module applied in a wireless mouse, the wireless mouse including a lower shell, the switch module comprising:
a pressing button including a fastening element, one end of the fastening element extending outward to form a cantilever arm, one end of a bottom surface of the cantilever arm protruding downward to form an operation rod, a rear of the lower shell defining a sliding groove penetrating through the lower shell along an up-down direction, the operation rod being slidably exposed to the sliding groove, a rear end and a front end of the sliding groove being defined as a first position and a second position, the operation rod sliding from the first position to the second position, the other end of the bottom surface of the cantilever arm extending outward to form an extending arm disposed to one end of the operation rod, two portions of one end of a top surface of the cantilever arm protruding upward to form two extending feet; and
a circuit board being disposed above and facing to a top surface of the pressing button, the circuit board being equipped with a first switch and a second switch, the first switch being mounted to a top surface of one side of the circuit board, the second switch being mounted to a bottom surface of the circuit board, one side of the first switch having a sliding bar, the sliding bar being clamped between the two extending feet,
wherein when the operation rod is located at the first position, the two extending feet are without driving the first switch, at the moment, a power function is turned off, when the operation rod is located at the second position, the two extending feet drive the sliding bar of the first switch to move, at the moment, the power function is turned on, the operation rod is pressed to make the extending arm pressed on and touch the second switch to execute a bluetooth pairing function.

16. A wireless mouse, comprising:
a lower shell;
an upper shell covered to the lower shell to form an accommodating space between the upper shell and the lower shell; and
a switch module accommodated in the accommodating space, the switch module including
a pressing button including a fastening element, one end of the fastening element extending outward to form a cantilever arm, one end of a bottom surface of the cantilever arm protruding downward to form an operation rod, a rear of the lower shell defining a sliding groove penetrating through the lower shell along an up-down direction, the operation rod being slidably exposed to the sliding groove, a rear end and a front end of the sliding groove being defined as a first position and a second position, the operation rod sliding from the first position to the second position, the other end of the bottom surface of the cantilever arm extending outward to form an extending arm disposed to one end of the operation rod, two portions of one end of a top surface of the cantilever arm protruding upward to form two extending feet, and
a circuit board being disposed above and facing to a top surface of the pressing button, the circuit board being equipped with a first switch and a second switch, the first switch being mounted to a top surface of one side of the circuit board, the second switch being mounted to a bottom surface of the circuit board, one side of the first switch having a sliding bar, the sliding bar being clamped between the two extending feet, wherein when the operation rod is located at the first position, the two extending feet are without driving the first switch, at the moment, a power function is turned off, when the operation rod is located at the second position, the two extending feet drive the sliding bar of the first switch to move, at the moment, the power function is turned on, the operation rod is pressed to make the extending arm pressed on and touch the second switch to execute a bluetooth pairing function.

\* \* \* \* \*